March 19, 1963

J. ROSÁN ETAL

3,081,808

THIN-WALLED INSERTS AND METHOD OF MAKING SAME

Filed July 25, 1960

INVENTOR.
JOSÉ ROSÁN
ALBERT JACK LA TORRE
BY
Bacon + Thomas
ATTORNEYS

March 19, 1963

J. ROSÁN ETAL

3,081,808

THIN-WALLED INSERTS AND METHOD OF MAKING SAME

Filed July 25, 1960

INVENTOR.
JOSÉ ROSÁN
BY ALBERT JACK LA TORRE

Baron + Thomas

ATTORNEYS

March 19, 1963   J. ROSÁN ETAL   3,081,808
THIN-WALLED INSERTS AND METHOD OF MAKING SAME
Filed July 25, 1960   9 Sheets-Sheet 5

INVENTOR.
JOSÉ ROSÁN
BY ALBERT JACK LA TORRE

Bacon + Thomas
ATTORNEYS

March 19, 1963  J. ROSÁN ETAL  3,081,808
THIN-WALLED INSERTS AND METHOD OF MAKING SAME
Filed July 25, 1960  9 Sheets-Sheet 6

INVENTOR:
JOSÉ ROSÁN
BY ALBERT JACK LA TORRE
Bacon Thomas
ATTORNEYS

March 19, 1963 J. ROSÁN ETAL 3,081,808
THIN-WALLED INSERTS AND METHOD OF MAKING SAME
Filed July 25, 1960 9 Sheets-Sheet 8

INVENTOR:
JOSÉ ROSÁN
ALBERT JACK LA TORRE
BY
Baron † Thomas
ATTORNEYS

March 19, 1963 J. ROSÁN ETAL 3,081,808
THIN-WALLED INSERTS AND METHOD OF MAKING SAME
Filed July 25, 1960 9 Sheets-Sheet 9

INVENTOR.
JOSÉ ROSÁN
ALBERT JACK LA TORRE
BY
Bacon + Thomas
ATTORNEYS

United States Patent Office 3,081,808
Patented Mar. 19, 1963

3,081,808
THIN-WALLED INSERTS AND METHOD OF MAKING SAME
José Rosán, Newport Beach, and Albert Jack La Torre, Santa Ana, Calif., assignors to Rosan Engineering Corporation, Newport Beach, Calif., a corporation of California
Filed July 25, 1960, Ser. No. 45,055
7 Claims. (Cl. 151—41.73)

The present invention relates to threaded inserts and to a method of making same.

More particularly, the invention concerns one-piece, thin-walled inserts designed to be mounted and locked in threaded bores in material softer than the insert material, and to the method of making such inserts.

The present inserts differ from all prior inserts in that they have a side wall of less radial thickness than that found in any prior inserts. The present inserts are further characterized by having higher strength characteristics, greater hardness and greater ductility than is found in any prior inserts. It has been found that very thin walled inserts made in accordance with the teachings disclosed hereinafter, will develop a holding power markedly superior to that of previously known, relatively thick walled inserts of the same internal size.

Inserts made in accordance with the principles of the present invention and having internal and external threads are designed so that the external threads are one size larger than the internal threads; the external threads preferably being made less than full standard depth in order to provide an uninterrupted thin-walled, radially flexible column between the internal and external threads.

One of the principal features of the present inserts is that they embody means for permanently locking the same against rotation in the threaded bodies or members in which they are mounted, and also may embody internal locking threads for preventing a bolt, stud, or other fastener mounted therein from becoming loose under conditions of excessive vibration. In this connection, the internal lock is formed by slightly depressing the root of one or more convolutions of the external thread to correspondingly modify the internal thread by reducing its diameter to form locking threads providing an interference fit with any fastener mounted therein.

The present inserts have all of the light-weight and small-space advantages of helical wire types of inserts, without being burdened with any of their disadvantages, such as requirnig the use of special tapping tools for the bores which receive the coils; special tools for inserting the coils in such bores; special coil removal tools; and complete lack of means for locking the coils in the threaded bores. Moreover, the feature of locking the present inserts in a threaded bore avoids backing out of the inserts from a parent body when a fastener mounted in the insert is sought to be removed, which frequently occurs with a helical wire coil type of insert. In addition, the bore from which one of the present inserts is removed does not require retapping, or enlarging and retapping. On the contrary, the removed insert can be immediately replaced by an insert of the same size.

The present inserts also have numerous advantages over prior thick-walled inserts provided with locking means in the form of bendable prongs or locking keys, in that they eliminate the prongs and can be more readily and quickly inserted and removed from a threaded opening than inserts of the type mentioned. Furthermore, the locking means for the present inserts can be provided at both ends of the inserts, depending upon the member in which they are to be mounted, thereby offering twice the resistance to removal obtained with locking means at one end of the insert.

The present inserts also have the advantage that the internal locking threads can be located at any desirable point along the length of the inserts, or the inserts may be provided with locking threads at a plurality of points along their length.

Another feature of the present inserts is that, for any given fastener size, they can be mounted in bosses of smaller outside diameter and at closer distances from the edge of a body, and still meet specification requirements, than can be done with any prior inserts.

Accordingly, the principal object of the invention is to provide an insert of extremely thin side wall construction that can be mounted in a threaded opening, locked in the opening and subsequently removed, if necessary, all with the use of extremely simple tools.

Another object is to provide an insert having internal locking threads and flexible side walls providing unusually high wear resisting characteristics enabling a fastener to be mounted in and removed from the insert a great number of times without damage to the internal locking threads, and without reducing the effectiveness of the locking action of the internal locking threads.

Another object is to provide an insert of extremely thin side wall construction which can be expanded sufficiently at one end thereof to effectively lock the insert in a bore without cracking.

A more specific object is to provide an insert that can be expanded to provide a lock with a threaded opening at both ends of the insert and thus double the torque resistance to backing out when a fastener mounted therein is being removed.

Another object is to provide a self-tapping insert having an extremely thin side wall.

Still another object is to provide an extremely thin-walled, threaded, tapered insert than can be mounted in a threaded tapered bore.

Still another object is to provide an insert that can be mounted in numerous elements, including various nut structures of relatively light or soft material to provide hard wear resistant threads therein.

A further object is to provide a thin-walled insert that can be locked in place in a threaded bore and serve as a shaft bushing, drill guide, etc.

A further object is to provide an insert that can be installed in a threaded bore in plastic materials, such as, "Plexiglas" or "Lucite," and expanded to lock the same in the bore without causing crazing or cracking in the plastic material.

A still further object is to provide a method of making a one-piece lockable insert, and a method of providing an internal locking thread in an insert.

A still further object is to provide relatively simple tools for driving, locking and removing an insert embodying the principles of the present invention.

A more specific object is to provide a locking tool that will expand an insert at localized portions of the insert to lock in a bore.

Another specific object is to provide a driving tool for an insert that will have maximum surface contact with the threads of the insert to prevent damage to or shearing of the threads during driving of the insert.

Another specific object is to provide a simple tool that can be used to both drive and expand a thin-walled insert.

Another object is to provide an insert having internal locking threads and flexible side walls providing unusually high wear resisting characteristics enabling a fastener to be mounted in and removed from the insert a great number of times without damage to the internal locking threads, and without reducing the effectiveness of the locking action of the internal locking threads.

Another object is to provide an insert of extremely thin side wall construction which can be expanded sufficiently at one end thereof to effectively lock the insert in a bore without cracking in its expanded region.

A more specific object is to provide an insert that can be expanded to provide a lock with a threaded opening at both ends of the insert and thus double the torque resistance to backing out when a fastener mounted therein is being removed.

Another object is to provide an extremely thin-walled, threaded tapered insert that can be mounted in a threaded, tapered bore and form a seal at the threads.

Other objects and advantages of the invention will become apparent from the following description taken in conjunction with the accompanying drawings, in which.

Figure 1:
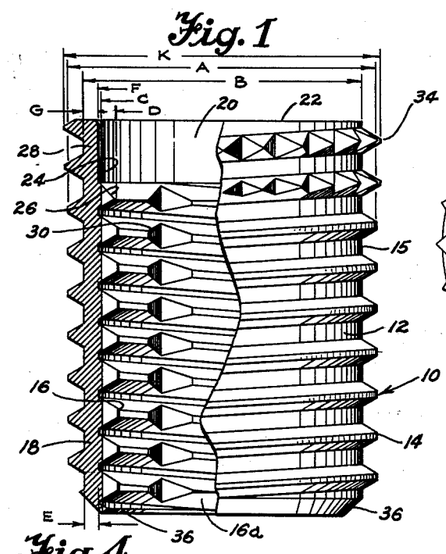
FIG. 1 is a greatly enlarged quarter sectional view of an insert embodying the principles of the present invention.
Figure 2:
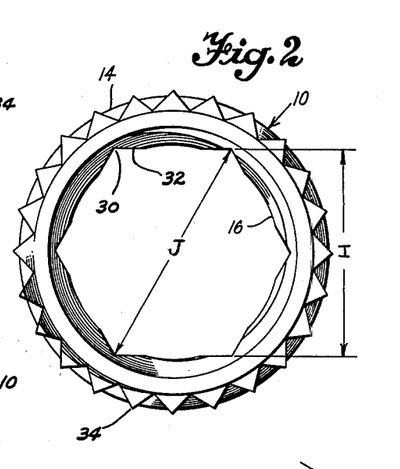
FIG. 2 is a plan view of the insert of FIG. 1.

Referring to FIGS. 1 and 2, the new insert is generally identified by the numeral 10 and comprises a tubular body 12 provided with external threads 14 and internal threads 16. The external threads 14 have a major or crest diameter indicated by the dimension A, and a minor or root diameter indicated by the dimension B. The external threads 14 are shallower in depth than a standard thread of the corresponding size and pitch, so that the diameter B of the thread root 15 is larger than the root diameter of a standard size thread, as will be explained more fully hereinafter. The internal threads 16 have a major or root diameter indicated by the dimension C and a minor or crest diameter indicated by the dimension D. The diameters C and D correspond to those of a standard size thread. In other words, the internal threads 16 are preferably unmodified in order that they can receive any fastener provided with corresponding standard threads.

The insert 10 has a radial wall thickness "E" equal to ½ (B—C) that is substantially less than has been provided heretofore in inserts of the same general type. Such thin wall construction has been made possible by forming the insert 10 with external threads 14 one size larger than the internal threads 16, and preferably modifying the external threads 14 by making their depth substantially less than standard depth.

According to the present invention, the external threads 14 have a radial depth of about 50 to 55% of the standard depth. The use of a modified external thread makes it possible to maintain a continuous thin wall or column 18 of minimum thickness E throughout the internally threaded length of the insert. The insert 10 has a counterbore 20 at its upper end 22 of a depth equal to about twice the pitch of the external threads 14, but this depth may be varied as desired. The counterbore 20 is formed by a cylindrical wall 24 and a beveled wall 26 extending on an angle of 45°. The wall 24 has a diameter F that is preferably a few thousandths of an inch larger than the root diameter C of the internal threads 16, so that a thin expandible wall 28 having a radial thickness of a dimension G is provided at the outer end of the insert. Thus, the expandible wall 28 is slightly thinner than the column wall 18.

The internal threads 16 are intersected by six longitudinal V-shaped grooves 30 defining a hexagon-shaped recess within the insert 10 and adapting the threads 16 to be engaged by a hexagonal drive member of corresponding shape and size for driving the insert into a threaded bore. The sides 32 of the grooves 30 intersect at an angle of 120°, and the distance across the flats of the hexagon has the dimension I. FIG. 2. The diametrical distance between the apices of the grooves 30 is represented by the dimension J. The grooves 30 need not extend for the full length of the insert 10 and may be terminated at any desired depth. The external threads 14 in the region of the counterbore 20 are knurled or longitudinaly serrated through at least two convolutions to provide relatively sharp teeth 34 for engaging a surrounding body to form a permanent lock therewith. The teeth 34 have sides of volute shape due to the formation thereof by serrated rollers (not shown). The lower end of the insert 10 is chamfered internally and externally on an angle of about 30°, as indicated at 36 in FIG. 1. The knurling operation raises the crest of the threads 14 in forming the teeth 34, so that the diameter K across the points of the teeth is a few thousandths of an inch greater than the original crest diameter A.

Figure 4:
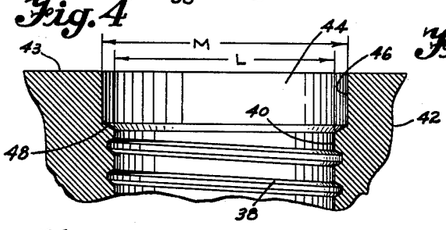
FIG. 4 is a fragmentary vertical sectional view through a body having a threaded bore that is counterbored at its outer end and adapted to receive the insert of FIG. 1.

As has been indicated above, it is preferable to make the external threads 14 shallow, or of less than standard depth. In accordance with the present invention, it is also preferred to make the threads 38, FIG. 4, in the insert-receiving bore 40 in a parent body 42 less than standard height, in view of the following:

If the shallow-depth external threads 14 are used with an unmodified bore thread, excessive torque would be required to mount the insert 10 in the bore, due to the interference between the crests of the bore threads and the root 15 of the external threads 14. In addition to excessive torque, there would be the possibility of distorting or crushing the thin-walled insert while it is being mounted in the bore. In the case of mounting the insert in "Plexiglas," "Lucite" and other plaster materials, the excessive stress concentration would cause crazing in the plastic. In order to avoid the foregoing difficulties, the bore 40 to receive the insert 10 is drilled with a tap drill of a dimension larger than would normally be used in providing a bore to be tapped for standard thread corresponding to the size of the external threads 14 on the insert. Accordingly, and as is shown in FIG. 4, the body of parent material 42 is drilled to provide the bore 40 having a dimension L. The outer end of the bore 40 is provided with a counterbore 44 having a cylindrical wall 46 of a diameter M and a beveled wall 48 extending on an angle of about 30°. The diameter M is such as to receive the locking teeth 34 with a minimum of radial clearance. Hence, the diameters K and M are made almost equal.

Figure 3:
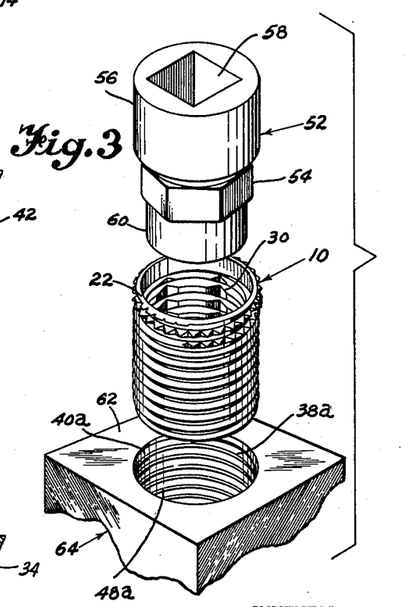
FIG. 3 is a perspective view illustrating, in vertical alignment, a parent body having a bore threaded throughout its length, the insert of FIG. 1 positioned to be mounted in the bore; and a tool for engaging and driving the insert into the bore.

It is not essential that the bore 40 be counterbored since the present insert can be used with a bore 40a that is threaded throughout its length, as in FIG. 3. In such case, the points of the teeth 34 may engage the root of the threads 38a, but this would not be objectionable since the teeth would ream out the root to make their own way, if necessary. In either instance, the diameter L of the drilled bores 40 and 40a is made greater than the crest diameter of the corresponding standard thread size, so that when threads 38 and 38a are tapped in the respective bores 40 and 40a, the crests are truncated as indicated at 48a in FIGS. 5 and 3, respectively. The diameter of the bore threads 38 is such that the crests 48a do not engage the root 15 of the external threads 14 of the insert 10. The clearance thus provided is shown exaggerated in FIG. 5 to emphasize the lack of stress concentration in these areas. Thus, it is simpler and more practical, in the interest of providing the thin wall 18 in the insert 10, to adapt the bore 40 in the body 42 to receive a modified external thread 14 (by using an over-size tap drill, for the bore 40) rather than modify the internal threads 16 of the insert 10 so that only special fasteners could be used therewith.

It will be understood, of course, that the advantages of the insert 10 can be realized by following the less desirable practice of making the internal threads 16 shallow and using a standard external thread 14.

In making the insert 10, a solid rod or bar of stock (not shown) of suitable metal is center-drilled at one end, and a portion of the end is rough turned and then finished to the desired outside diameter A, as can be readily visualized. The external threads 14 are then rolled into a predetermined length of the rod. From one to three convolutions of the threads 14 at the threaded extremity of the rod are next knurled to form the teeth 34. The rod is then rough drilled to provide a bore 16a and the finished counterbore 20. The bore 16a is then finish-reamed to the minor diameter L of the internal threads 16. The rod is then cut off by a parting tool at the end of the threaded portion remote from the teeth 34. The work piece is then finish faced, and internally and externally chamfered as shown at 36, at the end remote from the counterbore 44.

The cut-off work piece in the foregoing state is then rough-tapped to remove a major portion of the metal that will form the internal threads 16, and is then broached to provide the driving grooves or flutes 30. The internal thread 16 is then finish-tapped, completing machining of the insert 10 of FIG. 1, which is then heat treated to give it a hardness of 40 to 46 on the Rockwell C scale.

It will be noted from the foregoing that the teeth 34 are formed before the bore 16a is drilled and the counterbore 20 is formed. This procedure assures good knurling without distorting or damaging the insert material.

FIG. 3 shows an insert 10 in position to be mounted in the threaded and counterbored opening 40a. A simple driving tool 52 for driving the insert includes an intermediate hexagonal portion 54 adapted to engage with the grooves 30 formed in the internal threads 16 to impart torque to the insert 10 for mounting the same in the threads 38a. The tool 52 also includes a cylindrical portion 56 having a square socket 58 formed in one end thereof to receive a driving tool (not shown) having a projection of corresponding size and shape. The tool 52 has a cylindrical pilot portion 60 at its other end, which is snugly received within the internal threads 16.

The tool 52 is used to drive the insert 10 into the threaded bore 40a until the upper end 22 of the insert is about .015" to .025" below the top surface 62 of the body 64 containing the bore 40a. After the insert 10 has been mounted as described, the wall portion 28 is radially expanded to increase the diameter thereof to form a locking engagement between the teeth 34 and the surrounding threads 38a in the bore 40a. The wall 28 may be expanded by any suitable tool, but it is preferable to employ a tool that will uniformly expand the insert 10 a predetermined amount sufficient to exceed the elastic limit of the material of the insert, so that the expanded portion takes a permanent set and remains enlarged to provide a permanent lock between the insert 10 and the parent body 64.

Figure 6:
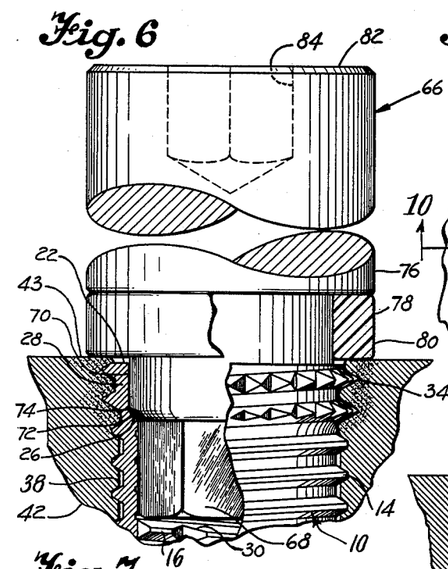
FIG. 6 is a view similar to FIG. 5, but showing the tool of FIG. 5 in full lines and the insert fully expanded at its outer end and locked in the body.

The insert 10 may be threaded into the bore 40, FIG. 4, by the tool 52, or by a combined driving and locking tool. FIG. 6 illustrates a simple tool 66 that can be used to drive the insert 10 into the bore 40, and also be used to subsequently expand the outer end portion of the insert into locking engagement with the softer parent body 42 in the region of the counterbore 44 to prevent relative rotation.

The tool 66 has a hexagonal drive portion 68 at one end adapted to engage with the grooves 30 to apply torque to the insert 10 to drive it into place. The hexagonal portion 68 also serves as a pilot for properly aligning the tool 68 with the insert 10 for performing a locking operation, as will be presently explained. The tool 66 includes a circular expanding portion 70 located adjacent the hexagonal portion 68. The expanding portion 70 has a rounded lower edge as indicated at 72 to facilitate entry into and expansion of the wall 28 defining the counterbore 20. The rounded edge 72 merges into a cylindrical side wall 74 of slightly larger diameter than the counterbore 20. The tool 66 has an enlarged upper end 76 forming a shoulder 78. A washer 80 of hard nylon or other suitable material surrounds the expanding portion 70 and one side of the washer is engaged with the shoulder 78. The tool 66 has a flat upper end 82 provided with a socket 84 adapted to receive a wrench (not shown) for rotating the tool 66.

Figure 5:
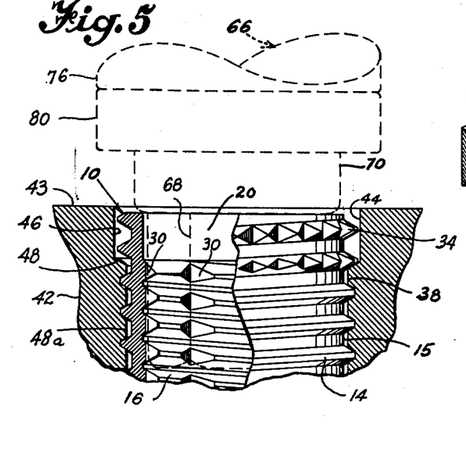
FIG. 5 is a view similar to FIG. 4, showing the insert of FIG. 1 after it has been mounted in the threaded bore in the body with a combined driving and locking tool shown in dotted lines in position ready to enter the insert to lock it in the counterbore of the body.

In using the tool 66, the hexagonal portion 68 is placed into the insert 10 as shown in FIG. 6, so that it engages with the grooves 30 in at least two of the internal threads 16. The tool 66 is rotated until the insert 10 is fully driven into the bore 40 with the upper end 22 of the insert disposed .015" to .025" below the top surface 43 of the parent material 42, as shown in FIG. 5. The insert 10 can now be locked in place by the same tool 66. FIG. 5 illustrates the tool 66 with the expanding portion 70 about to enter the counterbore 20; whereas, FIG. 6 illustrates the tool 66 after the expanding or locking operation has been completed. During a locking operation, the rounded portion 72 first engages the top edge 22 of the counterbore 20 adjacent its rim so that upon tapping the end 82 of the tool 66 with a hammer, the rounded portion 72 is forced to expanding the wall 28 in order to enter the counterbore 20 and engage the surface 24. Continued tapping will drive the expanding portion 70 into the counterbore 20 for its full depth, causing the rounded portion 72 to uniformly and progressively effect a downward and outward movement of the portion of the wall 28 lying in its path as the tool is forced into said counterbore. The rounded portion 72 thus performs a sort of "ironing out" operation on the wall 28 cold-working the same without applying undue pressure at any one point.

The tool 66 is designed so that the rounded portion 72 eventually engages the beveled portion 26 of the counterbore 20 just prior to the engagement of the nylon washer 80 with the surface 43 of the parent body 42. Hence, the insert 10, is further expanded and deformed at the beveled portion 26 of the counterbore 20 to make it assume a rounded configuration, as shown in FIG. 6, whereby to augment the locking effect obtained by the forced expansion of the wall 28. The rounded portion 72 also prevents damage to the lead thread of the internal threads 16.

As the wall 28 is moved outwardly by the tool 66, the teeth 34 penetrate the surrounding wall of the counterbore 44. The penetration of the teeth 34 causes some of the relatively softer parent material to flow inwardly and fill the threads 14 in the region of the teeth, hardening and compacting the displaced material of the body 42 as it does so. The expanding action of the tool 66 also causes the rim portion of the counterbore 44 to be raised slightly above the plane of the surface 43. The "nylon" washer 80 upon engaging the surface 43, prevents marring of the surface, and also effect coining of the raised rim at the counterbore in restoring it to its original flat condition, thereby further compacting and hardening the material. The expansion of the wall 28 thus effects a cold-working of the body material surrounding the teeth 34. The nylon washer 80 serves the further purpose of limiting the penetration of the tool 66 into the insert 10, thereby assuring that only a predetermined depth of the counterbore 20 is expanded. After the tool 66 has been driven to its full depth, it may be readily removed from the insert 10.

The afore-described cold-working of the wall portion 28 of the insert 10, and of the material of the parent body 42 surrounding said wall portion, greatly increases the hardness and tensile strength thereof, adding to the insert column resistance to pull out and greatly increasing the load value of the column. The cold-working also provides better fatigue-resistance properties in the insert 10 and parent body 42. The areas hardened by cold-working are shaded by stippling in FIG. 6. Very thin walled inserts so constructed and installed, develop holding power markedly superior to inserts of the previously known, relatively thick walled character having the same internal diameter.

The insert 10 of FIG. 3 may be mounted and locked in the bore 40a by the tool 66 in the same manner described above in connection with the locking of the insert 10 in the bore 40. However, it is to be understood that upon expansion of the thin wall portion 28 of the insert 10, the teeth 34 will penetrate directly into the root of the threads 38a to effectively lock the insert in place in the body 64.

Figure 7:
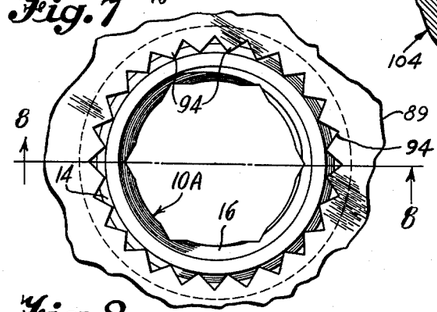
FIG. 7 is a plan view of an insert mounted in a bore of the type shown in FIG. 3, but wherein the bore has been modified by vertically serrating the threads at its upper end.
Figure 8:
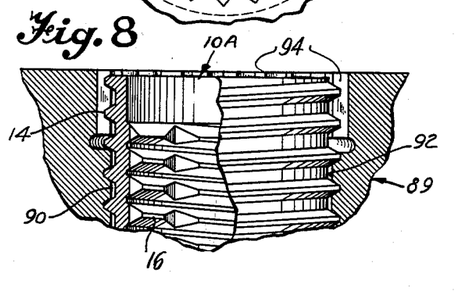
FIG. 8 is a fragmentary vertical sectional view taken on the line 8—8 of FIG. 7.

FIGS. 7 and 8 illustrate a body 89 having a modified threaded bore 90 in which threads 92 extend for the full length of the bore and in which bore an insert 10A is mounted that is similar in all respects to the insert 10, except that the teeth 34 have been omitted. The threads 92 are truncated in the same manner as the threads 38, so that they do not engage the root of the external threads 14 when the insert 10A is mounted in the bore 90. The bore 90 is pre-broached, that is, longitudinally serrated at 94 at its upper end prior to tapping the threads 92. The major diameter of the serrations 94 is slightly greater than the diameter of the rotor of the threads 92. Accordingly, when the insert 10A is mounted in the bore 90, the wall 28 can be expanded, forcing the threads 14 surrounding the same into engagement with the serrations 94 and into the spaces between the serrations 94, thereby providing a permanent lock between the insert 10A and the bore 90. The serrated and full-threaded bore 90, and the full-threaded, unserrated insert 10A are particularly well adapted for use in instances where the material of the body 89 is very hard. The insert 10A can be expanded and locked in the bore 90 by using the tool 66, as described above.

Figure 9:
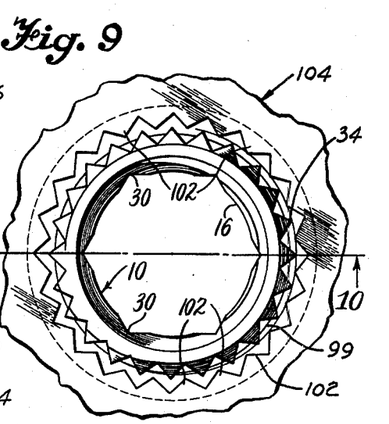
FIG. 9 is a plan view of an insert mounted in a bore of the type shown in FIG. 5, but modified by having a vertically serrated counterbore at its upper end.
Figure 10:
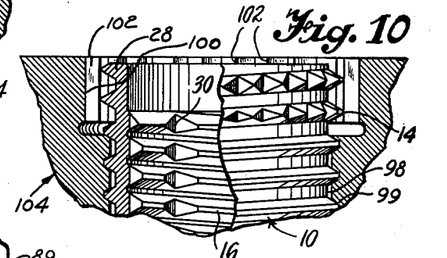
FIG. 10 is a fragmentary vertical sectional view taken on the line 10—10 of FIG. 9.

FIGS. 9 and 10 illustrate another type of threaded bore 98 similar to the bore 40, but wherein a counterbored portion 100 has longitudinal serrations 102 of a minor diameter slightly greater than the major diameter of the bore threads 99, so that upon expansion of the upper end portion 28 of the insert 10, the teeth 34 will be pushed into engagement with the serrations 102 and/or into the spaces between the serrations to form a permanent and effective lock between the insert 10 and the parent body 104. The teeth 34 can be omitted from the insert 10, as in the insert 10A, in which event the threads 14 surrounding the expandable wall 28 would lock with the serrations 102.

Figure 11:
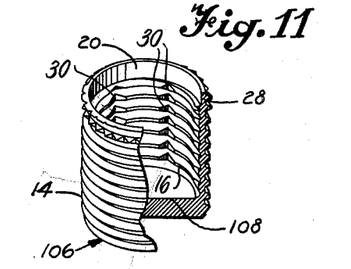
FIG. 11 is a quarter section perspective view of a blind insert embodying the principles of the invention.

FIG. 11 illustrates an insert 106, which is similar to the insert 10 of FIG. 1, but differs therefrom in that it is closed at its lower end by a bottom wall 108 to provide a blind, thin-walled insert. The parts of the insert 106 corresponding to those of the insert 10 are identified by the same numerals.

Figures 12, 13, 14, 15, 16, 17, 18:
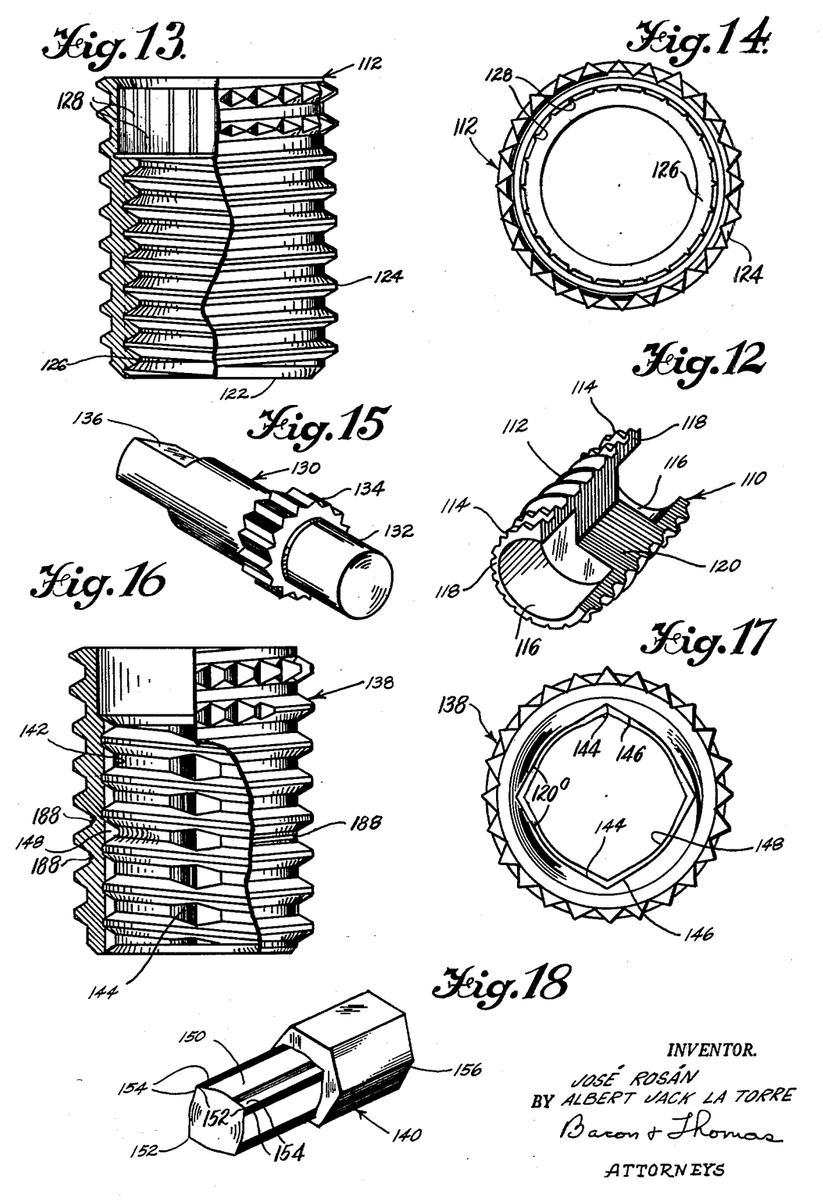
FIG. 12 is a perspective view partly in section of an externally threaded insert counterbored at both ends and having knurled threads in the region of the counterbores.
FIG. 13 is a vertical quarter sectional view of a modified insert which is counterbored at one end and internally serrated at the counterbore.
FIG. 14 is a plan view of the insert shown in FIG. 13.
FIG. 15 is a perspective view of a tool for driving the insert shown in FIGS. 13 and 14.
FIG. 16 is an elevational view, partly in section, of an insert having an internal thread lock and a modified driving groove arrangement.
FIG. 17 is a plan view of the insert shown in FIG. 16.
FIG. 18 is a perspective view of a driving tool for driving the insert shown in FIGS. 16 and 17.

FIG. 12 illustrates another form of insert 110, which has external threads 112, at least one convolution of which is knurled at each end of the insert to provide teeth 114. The insert 110 has counterbores 116 at its opposite ends to provide thin-walled portions 118 similar to the thin wall 28 of the insert 10. The thin-walled portions 118 are adapted to be expanded to lock the opposite ends of the insert 110 in a threaded bore in a parent body. The insert 110 has a solid central portion 120 intermediate the counterbore portion 116 that may be drilled to adapt the insert to serve as a drill guide. In either instance, drilling of the insert preferably is done after mounting. The insert 110 may be mounted in a threaded bore by inserting any conventional expandable tool into one of the counterbores 116 to frictionally engage with the counterbore to drive the insert into place. After driving, the insert 110 can be expanded at both ends by enlarging the counterbore 116 in the same manner previously described. The provision of the expandable portions at both ends of the insert 110 doubles the torque resistance of the insert to turning in a parent body.

FIGS. 13 and 14 illustrate an insert 122 which has external threads 124 and internal threads 126 extending throughout its length. The outer end portion of the insert 122 is counterbored and broached to provide longitudinal serrations 128 adapted to be engaged by a driving tool for driving the insert into a threaded bore. The serrations 128 are quite shallow and extend to a depth equal to at least the pitch of two of the external threads 124. A suitable tool 130 for driving the insert 122 is shown in FIG. 15. The tool 130 has a cylindrical pilot portion 132 at one end slightly smaller in diameter than the minor diameter of the threads 126. The tool 130 also has a serrated enlargement 134 adjacent the pilot portion 132. The serrations 134 are adapted to engage with the internal serrations 128 on the insert to provide a driving connection therebetween. The opposite end of the tool 130 may be flattened as indicated at 136 to provide wrench engaging surfaces to which driving torque may be applied by the tool 130 to the insert 122.

FIGS. 16 and 17 illustrate a modified form of insert 138. FIG. 18 illustrates a simple drive tool 140 for driving the insert 138. In FIGS. 16 and 17 the insert 138 is shown with internal threads 142 intersected by four longitudinal grooves 144 disposed 90° apart. The grooves 144 have side walls 146 that diverge on an angle of about 120°, as is best shown in FIG. 17. The disposition of the side walls 146 on an angle 120° provides a substantial face area on the teeth 142 that can be engaged by the driving tool 140. The grooves 144 do not extend to the root of the internal threads 142, nor do they extend across all of the threads 142. The grooves 144 may extend for any desired depth, and preferably across at least two of the internal threads 142. The ungrooved internal threads 142 thus provide added strength in the insert.

The insert 138 also differs from the inserts previously described herein in that it is provided with a unique internal locking thread 148 located at a point about midway of the height of the insert and extending through about 1½ convolutions of the internal thread 142. The internal locking thread 148 provides a peripheral lock for any threaded fastener that is mounted thereon. The manner in which the locking thread 148 is formed will be described in detail later.

Referring to FIG. 18, the driving tool 140 includes a cylindrical portion 150 which is of slightly smaller diameter than the crest diameter of the internal threads 142. The cylindrical portion 150 has four ridges 152 that extend radially therefrom and have a cross-section complemental to the grooves 144. In other words, the ridges 152 have side walls 154 that are 120° apart. The tool 140 has a hexagonal portion 156 engageable by a wrench for turning the tool.

The diameter of the tool measured through the apices of the ridges 152 is slightly less than the diameter across the insert between the apices of the grooves 144. Consequently, the cylindrical portion 150 and the ridges 152 are fit closely within the internal threads 142 so that effective driving engagement is obtained through the ridges 152 with the grooves 144, and between the cylindrical portions 150 of the tool 140 and the arcuate portions of the threads 142 between the side walls 146 of the grooves 144. In this way, a maximum of turning torque can be applied to the insert 138 by the tool 140 without danger of stripping or damaging the threads 142. The insert 138 can be driven and locked in a bore in the manner previously described.

Figure 19:
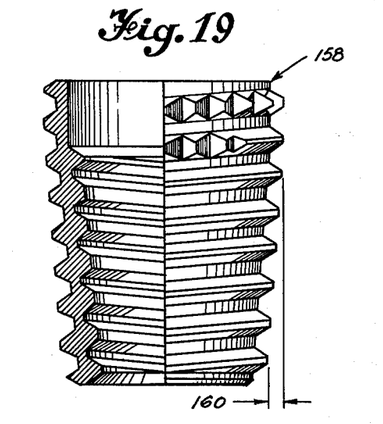
FIG. 19 is a quarter sectional view of a tapered insert embodying the principles of the present invention.

FIG. 19 illustrates an insert 158 of the same general type as the insert 10, but wherein the side wall of the insert is tapered to the extent indicated by the dimensions 160. This type of insert is particularly useful with pipe fittings where it is desired to provide a seal at the threads. The insert 158 can be driven and locked in the same manner described above.

Figure 20:
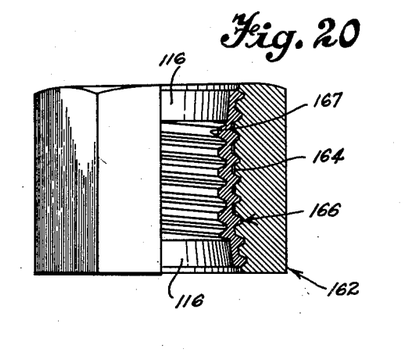
FIG. 20 is a quarter sectional view of a conventional nut having an insert mounted therein and locked in place at both ends.
Figure 21:
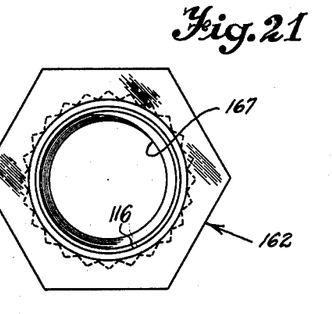
FIG. 21 is a bottom plan view of the nut and insert shown in FIG. 20.

FIGS. 20 and 21 illustrate a conventional nut 162 having a threaded bore 164 in which an insert 166, similar to the insert 110 of FIG. 12, but internally threaded at 167, has been mounted and locked in place by expanding the counterbored portions 116. The combination of the nut 162 with the double-locked insert 166 provides a structure having exceptionally high torque resistance.

Figure 22:
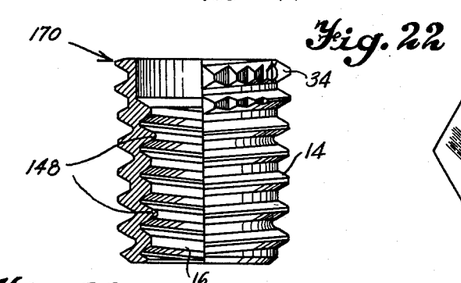
FIG. 22 is a quarter sectional view of an insert of the type shown in FIG. 21, but modified to include axially spaced internal locking threads.

FIG. 22 shows an insert 170, similar to the insert 10, but wherein the root of the external thread 14 has been depressed at longitudinally spaced points to provide two internal locking threads 148. The locking threads 148 are preferably located beyond the second convolution of the internal lead thread 16 in order to enable a fastener to have a substantial start in the insert before engaging the locking thread 148. Any number of peripheral locking threads 148 may be provided in the insert, depending upon the length of the insert. It will be obvious, of course, that the more locking threads that are provided, the greater will be the torque resistances offered by the insert to backing out of a fastener. The use of two locking threads, as shown, doubles the locking effect of the single thread shown in FIG. 16.

Figure 23:
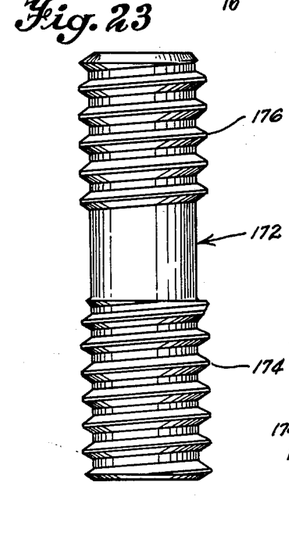
FIG. 23 is an elevational view of a standard stud threaded at both ends.
Figure 24:
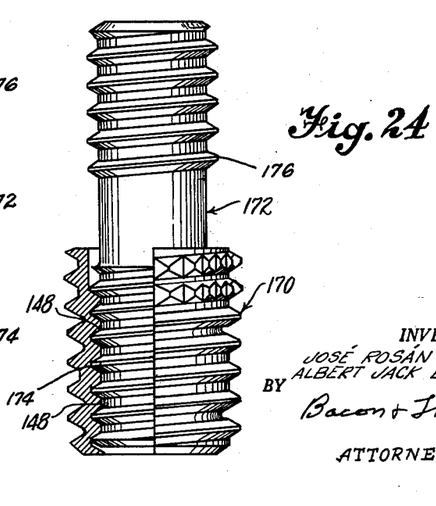
FIG. 24 is a view showing the stud of FIG. 23 mounted in the insert of FIG. 22, the insert being shown in cross-section.

The insert 170 is especially adapted to be used with a standard stud 172 of the type shown in FIG. 23, which has threads 174 and 176 at its opposite ends. FIG. 24 shows the insert 170 mounted upon the threads 174 at the lower end of the stud 172. The internal locking threads 148 effectively lock the stud 172 against turning, so that when the insert 170 is locked in a parent body, the stud 172 may be removed without backing the insert out of the parent body. Moreover, any fastener, such as a nut, mounted upon the threads 176 can be removed without backing the stud 172 out of the insert 170.

Figure 25:
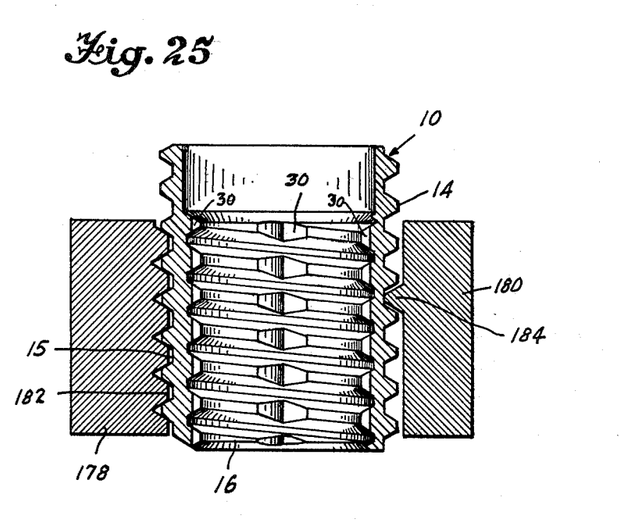
FIG. 25 is a diagrammatic vertical sectional view of an insert of the type shown in FIG. 16 disposed between the plate dies used for rolling the locking thread in the insert.

The peripheral locking threads 148 are preferably formed in the insert 138, FIGS. 16 and 17, after it has been otherwise completely machined and heat treated to harden the same. This has the advantage that the dimensions of the locking thread 148 can be held to close tolerances since no size deviation is introduced by subsequent heat treatment. The locking threads 148 are formed by a cold-rolling operation. FIG. 25 diagrammatically illustrates the manner in which the locking thread 148 is formed. Thus, an insert such as the insert 10 of FIG. 1, is placed between a pair of die-rolling plates 178 and 180. The plate 178 is similar to the plate originally used to roll the shallow external thread 14, except that the thread forming ridges 182 are ground off so that they do not engage the root 15 of the external thread 14, but clear the same by a few thousandths of an inch. No change is made in the sides of the ridges 182. Hence, they engage and support the flanks of the thread 14 against distortion during the rolling of the locking thread 148.

The die-late 180 is positioned on the opposite side of the insert 10 and is provided with a single ridge 184 located at the point where the locking thread 148 is to be formed in the insert. The ridge 184 is of slightly greater height than the ridges on the die-plates previously used to form the threads 14 and may have the configuration of a die for forming a thread of standard depth. The sides of the ridge 184 are preferably parallel with the flanks of the threads 14 but may be relieved slightly to permit drawing in of the metal during rolling. The difference in angle may be about one degree at each side, so that the angle of the sides of the ridge 184 is about 58°, compared with the 60° angle of the threads 14. The foregoing relation is diagrammatically shown in FIG. 26 wherein a portion of the insert 10 and a portion of the die-plate 184 are shown to greatly magnified scale. It will be noted that the face of the ridge 184 is narrower than the root 15 of the thread 14 so that a distinct, depressed groove 188 having the contour shown in dotted lines is formed in the root.

Figure 26:
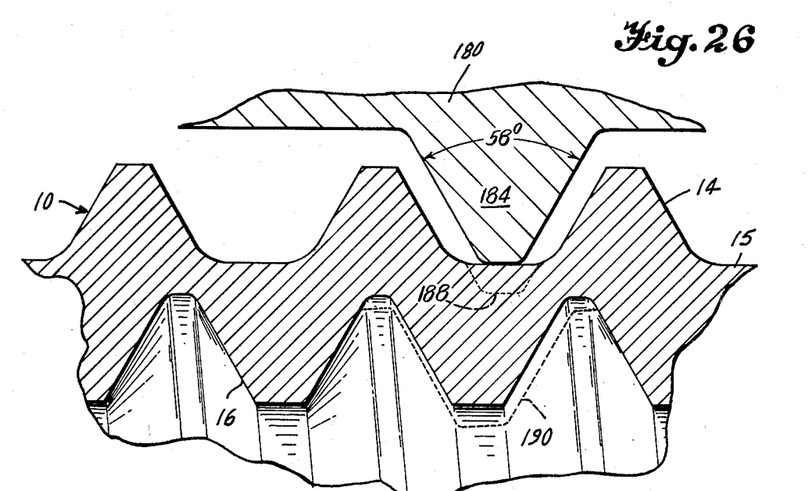
FIG. 26 is a greatly enlarged diagrammatic view illustrating a portion of the insert of FIG. 25 and a portion of the die that rolls the root of an external thread to form the internal locking thread, the latter being indicated in dotted lines.

During the rolling of the locking thread 148, the die-plate 178 supports the flanks of the thread 14 to prevent distortion thereof, while the die-plate 180 applies pressure to the insert 10 to depress the root 15 inwardly about .001", or more, depending on the diameter of the insert, to the depth indicated by the dotted line 188. As the die-plate 180 is pressed toward the insert 10 and moved relative thereto, the ridge 184 in depressing the root 15, as indicated above will cause a corresponding portion of the internal thread 16 to be deformed inwardly to reduce its crest diameter and form a locking thread 148, the typical distortion and contour of the internal threads 16 being indicated by the dotted line 190. In view of the fact that the external threads 14 and the internal threads 16 have a different pitch, the rolling of the root 15 of the external thread effects a slight change in the lead of the locking thread 148, as illustrated, which enhances the locking action of the thread.

During the rolling of the locking thread 148, the insert 10 is preferably rotated through about 1½ turns, so that locking thread 148 extends through about 1½ convolutions of the internal threads 16. The locking thread 148 may extend through two convolutions, but preferably not less than one. Extending the locking thread 148 through an angle in excess of 360° will avoid unequal pressure on the locking thread and insure a uniform resistance to rotation of a fastener throughout the periphery of the fastener. Consequently, a uniform torque is required to turn the fastener relative to the locking thread 148.

One of the unique features of the locking thread 148 combined with the resilient, ductile side wall construction of the present insert is that, the insert is capable of "breathing," or yielding, and expanding when the locking thread is engaged by a fastener. Torque tests have shown that the present insert has the unexpected and unusual characteristic of requiring breakaway torque equal to the drive torque applied to the fastener, and in some instances the breakaway torque has exceeded the drive torque. In prior fasteners, the breakaway torque is invariably only a minor fraction of the drive torque. Hence, the present insert is far superior to all prior inserts in resisting loosening under conditions of severe vibration.

Figures 26A, 26B, 26C:
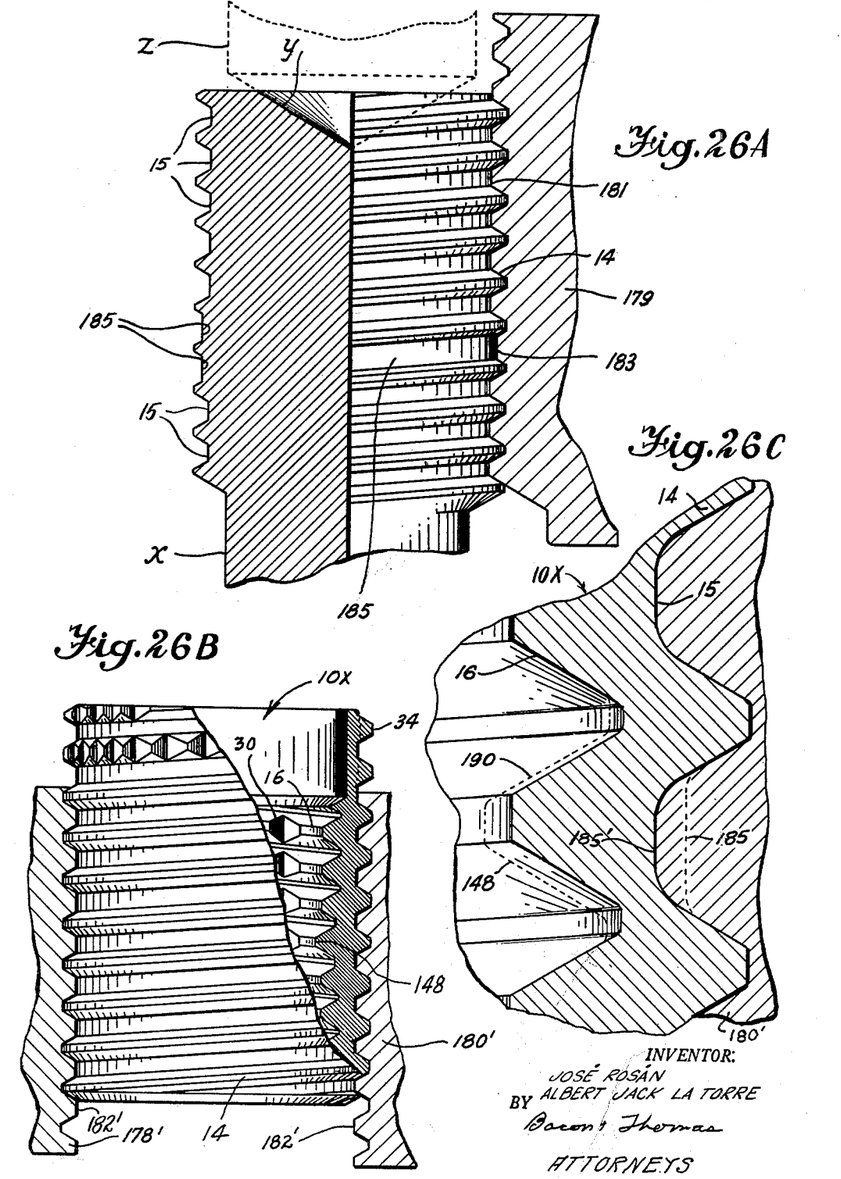
FIG. 26A is a diagrammatic sectional view illustrating a step in another method of rolling the external thread prior to forming a locking thread within the insert.
FIG. 26B is a diagrammatic sectional view illustrating the step of re-rolling the external thread to form the internal locking thread.
FIG. 26C is a greatly enlarged diagrammatic view of a portion of the insert and die that rolls the internal locking thread.

FIGS. 26A, 26B and 26C diagrammatically illustrate another method of forming a peripheral locking thread 148 in the insert 10. FIG. 26A illustrates one end of a piece of bar stock X having a center drill Y formed in one end thereof and engaged by a lathe center Z, the latter being shown in dotted lines. The external thread 14 is formed in the bar stock by one or more rollers or dies 179. The die 179 shown has ridges 181 that roll the major portion of the length of the external thread 14 to the desired shallow depth of about 50 to 55% standard. A single ridge 183 on the die 179 is of less height than the remaining ridges 181, so that about 1 and ½ convolutions, indicated at 185, are shallower than the remaining root portions 15 of the external thread 14.

The additional machining operations on the insert 10, described in connection with FIG. 25, are then performed upon the bar stock X, so that the resulting insert 10X has the structure illustrated in FIG. 26B. The insert 10X is heat-treated to harden the same in the same manner as the insert 10. After heat treating, the external threads 14 are re-rolled by a cold-rolling operation to form the internal locking thread 148. The re-rolling is preferably effected by die plates 178' and 180' which, as in FIG. 25, do not engage the teeth 34 of the serrated threads. These die plates have ridges 182' all of which are of the same height, so that during the re-rolling operation, the shallow root portion 185, see FIG. 26C, is depressed inwardly from the position indicated in dotted lines to the full line position marked 185', which corresponds to the depth or root diameter of all of the remaining external threads 14. During the re-rolling operation, both die plates 178' and 180' cooperate to effect displacement of the root portion 185, and simultaneously support the flanks of the remaining external threads 14 against distortion. As the die plates 178' and 180' apply pressure to press the root portion 185 inwardly, the ridges 182' cause a corresponding portion of the internal thread 16 to be deformed inwardly to reduce its crest diameter and form the peripheral locking thread 148, the distortion of the internal threads 16 being indicated by the dotted lines 190. The rolling of the root portion 185 of the external thread 14 effects a slight change in the lead of the locking thread 148, as shown, which enhances the locking action.

The method of forming the locking thread 148 illustrated in FIGS. 26A, 26B and 26C has the advantage over the method illustrated in FIGS. 25 and 26, of providing an external thread 14 wherein the root diameter is uniform throughout the length of the insert.

Figure 27:
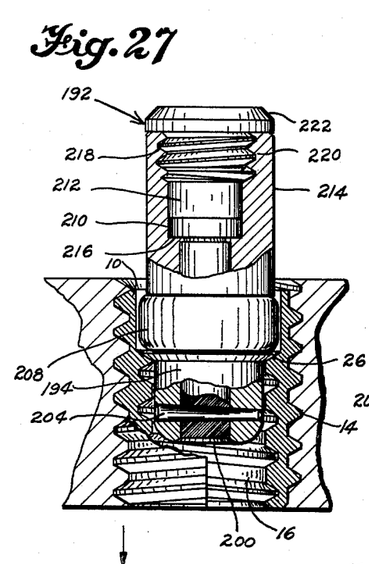
FIG. 27 is a view partly in section of a counterbored insert mounted in a bore with an expanding tool position in the insert ready for use to expand the insert.
Figure 28:
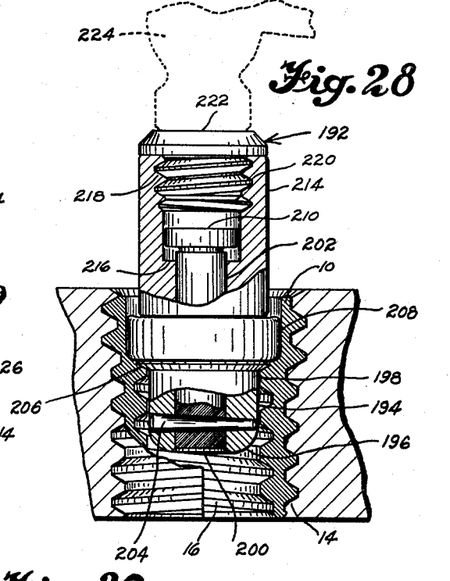
FIG. 28 is a view similar to FIG. 27, but showing the tool of FIG. 27 expanding a localized area of the counterbore of the insert.

FIGS. 27 and 28 illustrate another type of tool 192 that can be used to expand the insert 10 in the bore 40. The tool 192 includes a lower pilot portion 194 having a rounded corner 196 and a cylindrical portion 198 of a diameter slightly less than the minor diameter of the internal threads 16. The pilot portion 194 has an opening 200 for one end of a plunger 202 to which it is connected by a tapered pin 204. A washer 206 of a diameter greater than the minor diameter of the thread 16, but less than the diameter of the counterbore 20 is monuted on the plunger 202 adjacent the pilot portion 194. An annular rubber member 208 is mounted on the plunger 202 above the washer 206. The plunger 202 has a flange 210 slideably mounted in a bore 212 in a head 214. The bore 212 has a shoulder 216 that is normally held engaged with the flange 210 by pre-compressing the rubber member 208. The outer end of the bore 212 has a thread 218 in which is received a stem 220 attached to an anvil 222 serving as a closure for the bore 212.

FIG. 27 shows the tool 192 in position in the insert 10 ready to perform an expanding operation. It will be noted that the pilot portion 194 extends into the internally threaded portion of the insert and that the washer 206 rests upon the beveled wall 26. Upon striking the anvil 222 with a hammer 224, FIG. 28, the member 214 is forced downwardly, compressing the rubber member 208 and causing it to expand radially into pressure engagement with the counterbore wall 24 and effecting maximum localized expansion thereof in the area engaged by the rubber member 208. Hammer blows are delivered to the anvil 222 until the upper end of the insert 10 has been expanded to the extent desired, whereupon the tool 192 is removed from the insert.

Figures 29, 30, 31:
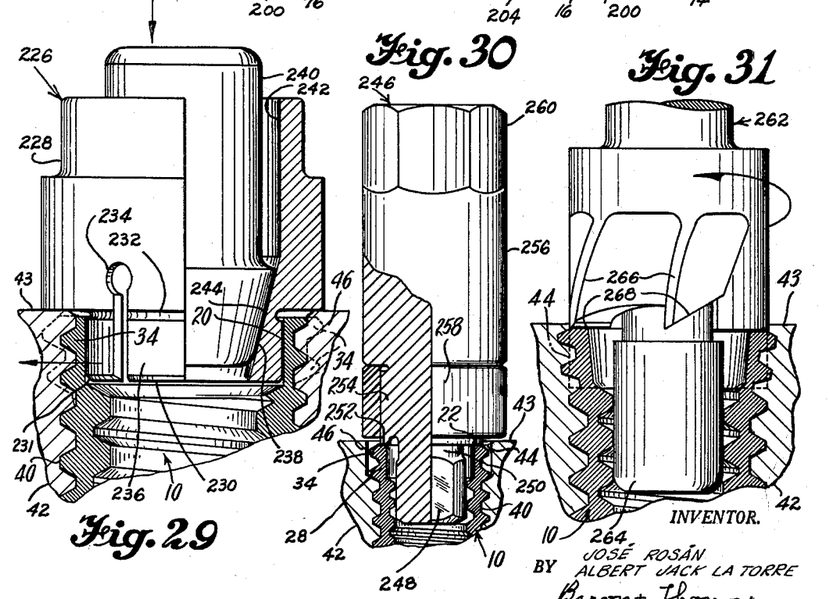
FIG. 29 is a view partly in section illustrating another type of locking tool for expanding the insert in a bore.
FIG. 30 is a view partly in section of a combined driving and locking tool adapted to effect radial expansion of the counterbored portion of the insert by applying axial force thereto to outwardly buckle the same.
FIG. 31 is a view partly in section illustrating a tool adapted to cut away the upper end of a mounted insert to facilitate removal and replacement of the insert.

FIG. 29 illustrates another type of tool 226 that can be employed to expand the counterbored portion 20 of the insert 10 into locking engagement with a threaded bore 40. The locking tool 226 comprises a member 228, which has a reduced cylindrical extension 230 extending downwardly therefrom. A shoulder 232 is formed at the upper end of the cylindrical extension 230 and is adapted to rest upon the surface 43 of the parent body 42. The lower end of the extension 230 is beveled at 231 to facilitate entry thereof into the counterbore 20 of the insert 10. The member 228 has a plurality of vertical slots 234 originating therein above the shoulder 232 and extending downwardly through the extension 230, dividing the same into a series of resilient, expandable sections 236. The lower end of the member 228 has an internal surface 238 that tapers toward and extends through the extension 230. A drive member 240 is received in the member 228 and includes a cylindrical upper portion 242 and a frustoconical lower end 244 having a taper complementary to that of the surface 238.

In using the locking tool 226, the tool is positioned above the insert 10 with the expansible extension 230 disposed in the counterbore 20 and with the shoulder 232 engaged with the surface 43 of the body 42. The upper end of the drive member 240 is then tapped wtih a hammer to drive it into the member 228, with the result that the expandable sections 236 are spread apart and apply an expanding force to the insert wall 28, forcing it outwardly and causing the teeth 34 to penetrate the counterbore wall 46 to lock it in place. After the insert has been expanded to the extent desired, the tool 226 is removed.

FIG. 30 illustrates a combined driving and locking tool 246 having a hexagonal drive or pilot 248 at its lower end adapted to engage with the grooves 30 in the insert 10 for driving the same into the bore 40. The tool 246 has a reduced portion 250 adjacent to the pilot 248, which terminates in a blunt, undercut shoulder 252 having an outside diameter approximately equal to the root diameter of the external thread 14. A cylindrical portion 254 extends upwardly from the shoulder 252 and terminates in an enlargement 256 spaced a pre-determined distance axially from the shoulder 252. A hard nylon washer 258 is disposed between the shoulder 252 and the enlargement 256 and serves as a stop to limit movement of the shoulder 252 toward the insert 10. The opposite end of the tool 246 has a hexagonal portion 260 adapted to be engaged by a wrench for turning the tool.

In use, the hexagonal pilot 248 is placed within the hexagonal recess in the insert 10 and the tool 246 is rotated to drive the insert to the desired depth in the threaded bore 40, that is, until the upper end 22 of the insert is about .015″ to .025″ below the surface 43 of the body 42. The tool 246 is then permitted to remain in the insert, and its upper end 260 is tapped by a hammer to cause the shoulder 252 to engage the upper end 22 of the insert and cause the side wall 28 to bulge outwardly and effect penetration of the teeth 34 into the wall 46 of the counterbore 44. The nylon washer 258 serves as a stop to limit the extent of the shoulder 252 in the counterbore 20. After the wall 28 has been expanded to the extent desired, the tool 246 is removed from the insert.

FIG. 31 illustrates a simple form of cutting tool 262 for use in removing an expanded insert 10 from the parent body 42 so that it can be replaced by another insert of the same size. The tool 262 comprises a cylindrical pilot 264 that fits snugly into the threads 16. The tool 262 has cutting flutes 266 of an outside diameter equal to that of the original diameter of the wall 46 of the counterbore 44. The flutes 266 have cutting edges 268 adapted to penetrate and cut away the upper end of the insert in the region of the counterbore 44. The cutting tool 262 is rotated until a cut equal to the original depth of the counterbore 44 has been made in the parent body 42. This cutting operation will remove the major part of the expanded portion of the insert 10, severing the serrated threaded portion from the remainder of the insert so that upon removal of the tool the lower portion of the insert 10 can be easily backed out of the bore 38.

Figure 32:
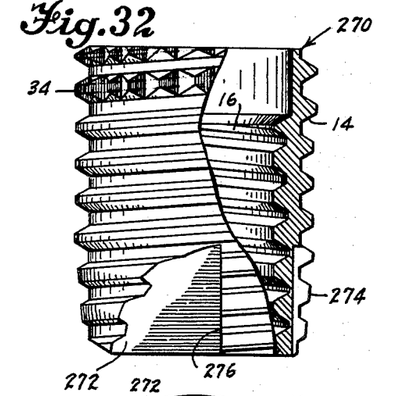
FIG. 32 is an elevational view partly in section of a modified insert provided with right angular notches at its inner end to render the same self-tapping.
Figure 33:
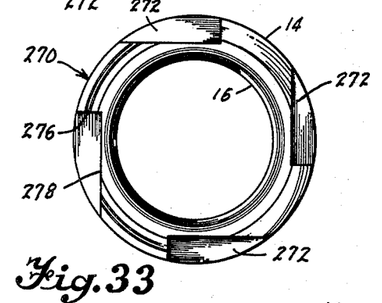
FIG. 33 is a view of the self-tapping end of the insert of FIG. 32.

FIGS. 32 and 33 show an insert 270 similar to the insert 10, but having tangent notches or cut away portions 272 spaced at points 90° around the lower end of the insert. The external threads 274 of the insert are tapered to reduce the diameter of the insert at its lower end to adapt it for self-tapping purposes. The cut away portions 272 provide thread cutting edges 276, which extend parallel with a diametrical line parallel wtih the axis of the insert. The tangent surfaces 278 extend perpendicular to the edges 276 and provide spaces for receiving chips during a thread cutting operation. In view of the shallow external thread on the insert 270, it is well adapted for use in an oversize bore in a parent body. Moreover, if the diameter of the bore is made equal to the pitch diameter of the external insert thread, the notches 272 can be omitted and the insert 270 mounted in such bore by a thread rolling, rather than a thread cutting action.

Figure 34:
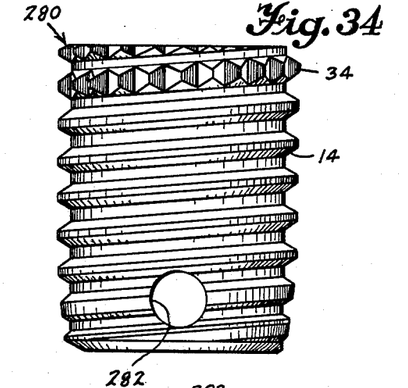
FIG. 34 is an elevational view of a self-tapping insert provided with diametrical openings to receive the chips of the thread being cut.
Figure 35:
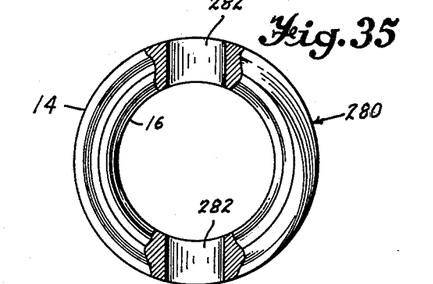
FIG. 35 is a view of the lower end of the insert of FIG. 34 with portions broken away to show the chip receiving openings.

FIGS. 34 and 35 illustrate an insert 280, similar to the insert 10, but provided with diametrical openings 282 of a diameter approximately equal to the pitch of about two of the external threads 14. One side of the openings 282 provide thread cutting edges on the threads 14 at the region of intersection and thus form a self-tapping insert. The openings 282 also provide space for the chips cut during a thread cutting operation.

Figures 36, 37, 38:
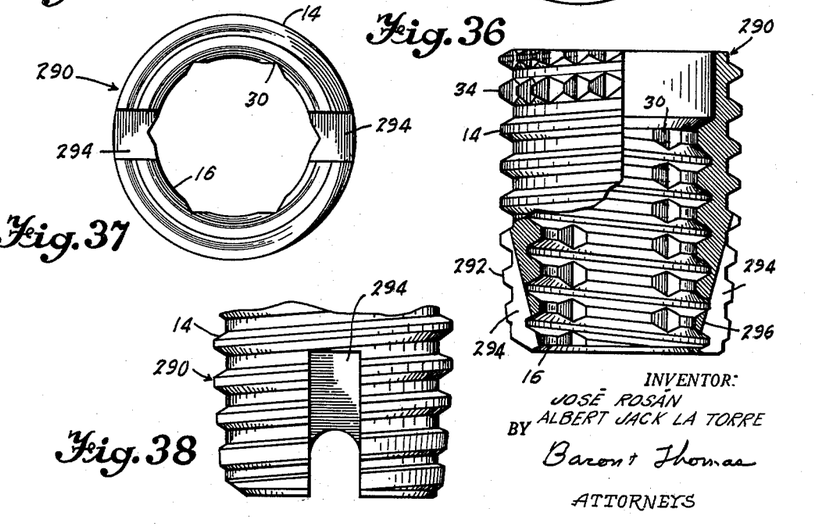
FIG. 36 is an elevational view partly in section of a self-tapping insert having diametrically opposed tapered notches extending through its side walls at the lower end thereof.
FIG. 37 is a view of the self-tapping end of the insert shown in FIG. 36.
FIG. 38 is a fragmentary side elevational view of the self-tapping end of the insert shown in FIGS. 36 and 37.

FIGS. 36, 37 and 38 illustrate a self-tapping insert 290 embodying the basic principles of the insert 10. The insert 290 is tapered at its lower end so that the external threads 292 have truncated crests. The side wall of the insert is intersected at diametrically opposite points by recesses 294 having a sloping bottom wall 296. The recesses 292 are diametrically opposed and the leading edges of the threads at one side of the recesses perform a thread cutting function as the insert is threaded into a drilled bore of suitable diameter.

Figure 39:
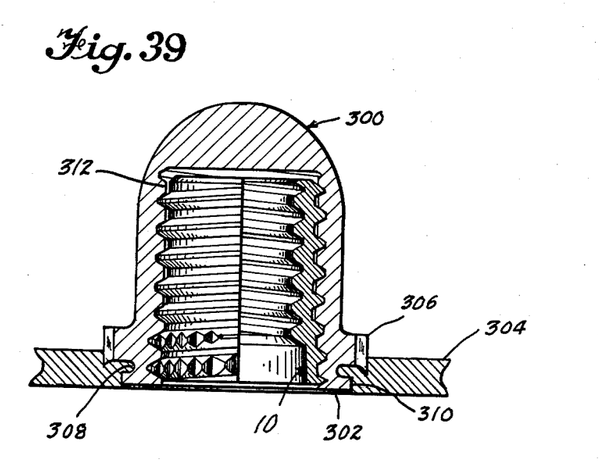
FIG. 39 is a vertical sectional view through a dome type of press nut mounted in a plate and having a tapered insert mounted therein.
Figure 40:
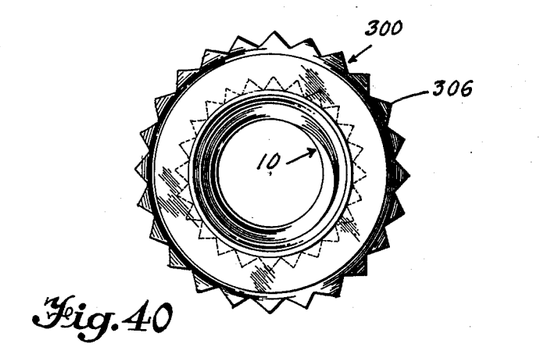
FIG. 40 is a bottom view of the dome nut and insert shown in FIG. 39.

FIGS. 39 and 40 illustrate a press-type dome nut 300 adapted to be mounted in an opening 302 in a plate 304. The nut 300 has a serrated locking flange 306 adjacent one end which is adapted to be bent downwardly to cause the material of the sheet 304 to be displaced and to flow inwardly into a groove 308 between the serrated flange 306 and a pilot flange 310. The dome nut may have any one of the several types of inserts disclosed herein, mounted in the threaded bore 312 thereof, but for purposes of illustration, a tapered insert 10 similar to the insert shown in FIG. 16 has been shown mounted in the bore 312. The dome nut 300 is particularly well adapted for use in connection with tapered studs or other fasteners where a leak-proof connection around the stud is desired.

It will be understood that any one of the internally threaded inserts disclosed herein can have one or more peripheral locking threads formed in the interior thereof. It will also be understood that while certain inserts have been shown mounted in a bore of a certain type, any given insert can be mounted and used in any other type of bore shown herein.

It will also be understood that the principle of making the external thread larger than the internal thread by one thread size is applicable to both fine threads and coarse threads. However, by way of illustration and not limitation, the following example is given relative to a fine-thread insert having a ¼ inch internal thread with 28 threads per inch, and a 5/16 inch external thread with 24 threads per inch. Such an insert will have the following principal dimensions, which should be considered in connection with FIG. 1, and with the understanding that they will vary within acceptable tolerances:

External thread 14: Inches
    Major diameter A about _________________ 0.312
    Minor diameter B about _________________ 0.2775
Internal thread 16:
    Major diameter C about _________________ 0.2500
    Minor diameter D about _________________ 0.215

Radial wall (18) thickness $E = \frac{B-C}{2} =$ $\frac{0.2785 - 0.2500}{2}$ __________________________ 0.0142

Diameter F of counterbore 20 in insert 10 about __________________________________ 0.250
Radial wall (28) thickness G of insert at counterbore 20 about __________________________ 0.0137
Distance H across flats of grooves 30 about ____ 0.242
Diameter K of teeth 34 about _________________ 0.315
Tap drill diameter L about _______________ 0.281 (9/32)
Counterbore (44) diameter M in parent body 42 about __________________________________ 0.3125

It will be noted from a comparison of the minor diameter B of the external thread 14 with the major diameter C of the internal thread 16 that the side wall 18 of the insert is about .01375" thick. In the smallest and thinnest inserts made in accordance with this invention, it is preferred to maintain a minimum side wall thickness of not less than .008" with a preferred minimum thickness of .011". It is to be understood, however, that this side wall thickness will vary with the sizes of internal and external threads employed in the inserts. Hence, the minimum thickness may exceed 0.020" in some inserts, but in any event, the side wall thickness in each insert will be substantially thinner than in prior inserts of the same internal thread diameter.

Other typical thread combination sizes of internal and external threads that may be used for the present insert are as follows:

| 1 | 2 | 3 | 4 | 5 |
|---|---|---|---|---|
| Internal thread size | External thread size | Minimum modified root dia. ext. thd. (inches) | Standard root dia. int. thd. (inches) | Minimum wall thickness (inches) |
| 10–32 | 1/4–28 | .2165 | .1900 | .0132 |
| 1/4–28 | 5/16–24 | .2775 | .2500 | .0137 |
| 5/16–24 | 3/8–24 | .3395 | .3125 | .0135 |
| 3/8–24 | 7/16–20 | .4000 | .3750 | .0125 |
| 7/16–20 | 1/2–20 | .4625 | .4375 | .0125 |
| 1/2–20 | 9/16–24 | .5280 | .5000 | .0140 |

In the above table, column 1 indicates the size of the internal thread of the insert; column 2 the size of the external thread; column 3 the minimum root diameter of the external thread in inches, which falls in the range of 50 to 55% of standard; column 4 the standard root diameter of the internal thread in inches; and column 5 the minimum wall thickness of the insert in inches. It will be noted that the minimum wall thickness shown is .0132, and that for the sizes shown, the wall thickness varies from .0132 to .0140. It will be clearly understood that these wall thicknesses will vary depending upon the variations in allowable tolerances for the given threads, between maximum and minimum. In any event, the wall thickness of any given insert made in accordance with the principles of this invention will be less than that of prior inserts of the same internal thread size.

The inserts disclosed herein may be made of any suitable material. It has been determined that a stainless steel known in the metallurgical field as "Armco" 17–4PH is an ideal material for use in making the present inserts. Another stainless steel known in the industry as "Armco" 17–10PH may be used where a non-magnetic material is desired for the insert. Certain aluminum alloys can also be used, including the well known aluminum alloy identified as 20–14T–6. The latter may be used where a hard, light-weight insert is desired. In this connection, the present thin-walled inserts made of stainless steel are characterized by their surprising lightness. For example, 1000 stainless steel inserts having a 1/4–28 internal thread and a 5/16–24 external thread, weigh only 2.7 lbs. The use of stainless steel and aluminum alloys is further preferable because of their corrosion resistant properties.

A steel alloy #4130 has also been found satisfactory, although it does not have corrosion resistant properties, it does have the strength characteristics of the above stainless steels.

The stainless steel materials mentioned above are particularly well suited for use in making the present thin-walled inserts for the reason that they can be heat-treated to give the inserts the desired high hardness, high ductibility and high modulus of elasticity required without rendering the same brittle or introducing other undesirable characteristics.

One of the preferred stainless steel materials for making the present inserts "Armco" 17–4PH has the following physical properties at room temperature:

Ultimate tensile strength _________ 190,000 lbs. p.s.i.
    (lbs. per sq. inch)
Yield .02% ____________________ 170,000 p.s.i.
Double shear __________________ 130,000 p.s.i.
Elongation in two inch __________ 10%.

Reduction of cross sectional area in test piece 37.5 to 40% Rockwell hardness C, scale 40 to 46.

A single internal locking thread 148 of 1½ convolution provides torque and pull out resistance that far exceeds the requirements of Military Specifications N–25027. (ASG)

Actual tests have also shown that the internal lock thread is capable of maintaining torque resistance meeting specifications even after 600 cycles of insertion and removal of bolts from the insert. This extremely long life of the locking thread 148 is believed to be attributable to the hardness of the material of the insert and to the fact the side wall 18 of the insert is thin, and resilient, enabling said side wall to flex outwardly when the locking thread is engaged by a fastener, rather than remaining rigid and causing excessive wear on the fastener threads and locking thread. Any of the inserts disclosed herein can have at least one, or more than one, locking thread formed therein, if desired.

While several types of expandable inserts have been disclosed herein, together with various tools for driving and locking the same in a thread bore, it will be understood that minor variations may be made therein without departing from the principle of the invention or the scope of the annexed claims.

We claim:
1. An insert, comprising: a tubular body having a series of internal and a series of external threads extending over substantially the entire length of said body, said external threads being one size larger than said internal threads, the external one of said series of threads having a root diameter substantially greater than normal to provide threads substantially less than standard in depth, so that 50 to 55 percent of the standard depth remains, whereby to provide a thin wall between said internal and said external threads, said insert having a plurality of drive grooves formed in its interior and intersecting at least the first two convolutions of said internal threads, said external thread having a portion of its root covering at least one thread convolution displaced inwardly with a corresponding reduction in diameter of the portion of the internal thread aligned therewith to provide an internal locking thread, extending over at least one thread convolution, said body being counterbored at at least one end in the region of said external threads to provide a thin expandable wall portion for locking the insert against rotation in a bore in a body, said external threads surrounding said counterbore being serrated to provide teeth for penetrating the wall of said bore.

2. An insert, comprising: a tubular body having a series of internal and a series of external threads extending over substantially the entire length of said body, said external threads being one size larger than said internal threads, the external one of said series of threads having a root diameter substantially greater than normal to provide threads substantially less than standard in depth, so that 50 to 55 percent of the standard depth remains, whereby to provide a thin wall between said internal and said external threads, said insert having a plurality of drive grooves formed in its interior and intersecting at least the first two convolutions of said internal threads, said external thread having a portion of one thread convolution disposed inwardly with a corresponding reduction in diameter of the portion of the internal thread aligned therewith to provide an internal locking thread, said body being counterbored at at least one end in the region of said external threads to provide a thin expandable wall portion for locking the insert against rotation in a bore in a body, said external threads surrounding said counterbore being serrated to provide teeth for penetrating the wall of said bore.

3. An insert, comprising: a tubular body having a series of internal and a series of external threads extending over substantially the entire length of said body, said external threads being one size larger than said internal threads, the external one of said series of threads having a root diameter substantially greater than normal to provide threads substantially less than standard in depth, so that 50 to 55 percent of the standard root depth remains, said remaining root portion preventing the external thread from intersecting with the internal thread to provide a thin wall between said internal and said external threads, said insert having a plurality of drive grooves formed in its interior and intersecting at least the first two convolutions of said internal threads, said body being counterbored at at least one end in the region of said external threads to provide a thin expandable wall portion for locking the insert against rotation in a bore in a body, said external threads surrounding said counterbore being serrated to provide teeth for penetrating the wall of said bore.

4. An insert as defined in claim 3 in which the thickness of the wall is .008″ to .020″.

5. An insert as defined in claim 3 having a hardness of 40 to 46 on the Rockwell "C" scale.

6. An insert, comprising: a tubular body having a series of internal and a series of external threads extending over substantially the entire length of said body, said external threads being one size larger than said internal threads; the external one of said series of threads having a root diameter substantially greater than normal to provide threads substantially less than standard in depth, so that 50 to 55 percent of the standard depth remains, the remaining root portion preventing the external thread from cutting into the internal thread whereby to provide a thin wall between said internal and said external threads; said insert having drive groove means for driving the same into a workpiece, said body being counterbored at at least one end in the region of said external threads to provide a thin expandable wall portion for locking the insert against rotation in a bore in a body, at least one complete convolution of said external threads surrounding said counterbore being serrated to provide an annular toothed portion expandable outwardly for penetrating the wall of said bore.

7. An insert having an internal thread lock as described, said insert having a circumferentially continuous tubular wall and having external and internal threads on said wall, said tubular wall being uniformly deformed radially inwardly along the root portion of said external threads through at least one convolution to form a uniformly deformed portion of reduced diameter on at least one convolution of said internal threads radially aligned with said inwardly deformed root portion to provide a locking thread, the crest diameter of the external thread being substantially unchanged.

References Cited in the file of this patent

UNITED STATES PATENTS

| | | |
|---|---|---|
| 1,692,497 | Furlan | Nov. 20, 1928 |
| 1,873,895 | Kimbell | Aug. 23, 1932 |
| 2,286,982 | Todd | May 15, 1944 |
| 2,375,249 | Richer | May 8, 1945 |
| 2,390,514 | Cram | Dec. 11, 1945 |
| 2,466,546 | Huelster | Apr. 5, 1949 |
| 2,492,536 | Rosan | Dec. 27, 1949 |
| 2,577,810 | Rosan | Dec. 11, 1951 |
| 2,703,418 | Poupitch | Mar. 8, 1955 |
| 2,722,698 | Green | Nov. 8, 1955 |
| 2,779,039 | Borner | Jan. 29, 1957 |
| 2,791,787 | Neuschotz | May 14, 1957 |
| 2,795,221 | Braendel | June 11, 1957 |
| 2,904,800 | Peterson | Sept. 22, 1959 |
| 2,984,279 | Rosan | May 16, 1961 |

FOREIGN PATENTS

| | | |
|---|---|---|
| 173,307 | Switzerland | Feb. 16, 1935 |